(12) United States Patent
Park et al.

(10) Patent No.: US 12,744,246 B2
(45) Date of Patent: Sep. 22, 2026

(54) EPOXY MODIFIED ADDITIVES FOR LITHIUM ION BATTERIES

(71) Applicant: Sionic Energy, Inc., Rochester, NY (US)

(72) Inventors: Dai in Park, Daejeon City (KR); Surya S. Moganty, Henrietta, NY (US); Joonbae Lee, Rochester, NY (US); Gabriel Torres, Rochester, NY (US); Rutvik Vaidya, Rochester, NY (US); Yue Wu, West Henrietta, NY (US); John Sinicropi, Rochester, NY (US)

(73) Assignee: Sionic Energy, Inc., Rochester, NY (US)

( * ) Notice: Subject to any disclaimer, the term of this patent is extended or adjusted under 35 U.S.C. 154(b) by 694 days.

(21) Appl. No.: 18/023,445

(22) PCT Filed: Mar. 23, 2021

(86) PCT No.: PCT/US2021/023627
§ 371 (c)(1),
(2) Date: Feb. 27, 2023

(87) PCT Pub. No.: WO2022/046174
PCT Pub. Date: Mar. 3, 2022

(65) Prior Publication Data

US 2023/0352736 A1 Nov. 2, 2023

Related U.S. Application Data

(60) Provisional application No. 63/071,020, filed on Aug. 27, 2020.

(51) Int. Cl.
*H01M 10/0567* (2010.01)
*H01M 10/0568* (2010.01)
(Continued)

(52) U.S. Cl.
CPC ... *H01M 10/0567* (2013.01); *H01M 10/0568* (2013.01); *H01M 10/0569* (2013.01);
(Continued)

(58) Field of Classification Search
CPC ......... H01M 10/0567; H01M 10/0568; H01M 10/0569
See application file for complete search history.

(56) References Cited

U.S. PATENT DOCUMENTS

2006/0088763 A1 4/2006 Li et al.
2012/0315549 A1 12/2012 Tang et al.
(Continued)

FOREIGN PATENT DOCUMENTS

CN 105633460 A 6/2016
JP 2009-038028 A 2/2009
(Continued)

OTHER PUBLICATIONS

International Search Report for PCT/US21/23627 dated Jun. 9, 2021, 1 page.
(Continued)

*Primary Examiner* — Kevin E Yoon
(74) *Attorney, Agent, or Firm* — Cozen O'Connor

(57) ABSTRACT

Epoxide functionalized organic compounds and an electrolyte containing the epoxide functionalized organic compound additive suitable for use in electrochemical energy storage devices useful for reducing battery resistance, increasing cycle life, and improving high-temperature performance are disclosed.

36 Claims, 6 Drawing Sheets

(51) Int. Cl.
*H01M 10/0569* (2010.01)
*H01M 50/414* (2021.01)
*H01M 50/491* (2021.01)

(52) U.S. Cl.
CPC ....... *H01M 50/414* (2021.01); *H01M 50/491* (2021.01); *H01M 2300/0028* (2013.01)

(56) References Cited

U.S. PATENT DOCUMENTS

2015/0079483 A1 3/2015 Cresce et al.
2016/0036013 A1 2/2016 Nakazato et al.
2016/0172708 A1 6/2016 Porta et al.
2016/0172709 A1 6/2016 Porta Garcia et al.
2019/0020069 A1 1/2019 Moganty et al.
2020/0388876 A1* 12/2020 Ji .......................... H01G 11/30
2023/0352736 A1 11/2023 Park et al.

FOREIGN PATENT DOCUMENTS

JP 2016-527682 A 9/2016
KR 101535071 7/2015
WO 2019/018435 A1 1/2019
WO 2020/054863 A1 3/2020

OTHER PUBLICATIONS

European Patent Application No. 21862252.0 Search Report dated Apr. 2, 2025, 8 pages.
Japanese Patent Application No. 2023-513316 Notice of Reasons for Rejection dated May 8, 2025 with English translation, 9 pages.

* cited by examiner

EPOXY MODIFIED ADDITIVES FOR LITHIUM ION BATTERIES

CROSS REFERENCE

This application claims the benefit of the filing date of U.S. Provisional Patent Application No. 63/071,020, filed Aug. 27, 2020, which is hereby incorporated by reference in its entirety.

FIELD

The present disclosure relates to epoxide functionalized organic compounds that are useful for reducing battery resistance, increasing cycle life, improving high-temperature performance; an electrolyte containing the epoxide functionalized organic compound additives, and electrochemical energy storage devices containing these electrolytes.

BACKGROUND

Li-ion batteries are heavily used in consumer electronics, electric vehicles (EVs), as well as energy storage systems (ESS) and smart grids. Recently, Li-ion batteries with voltages above 4.35 V have gained importance because of higher capacity and subsequent energy density benefits. However, the stability of the cathode materials at these potentials reduces due to increased oxidation. This may result in electrochemical oxidation of the material to produce gases, and that can deteriorate the performance of the battery. The cathode active material, which is capable of intercalating/deintercalating lithium ions may dissolve in the non-aqueous electrolyte, resulting in a structural breakdown of the material, and will lead to an increase in the interfacial resistance. These Li-ion batteries are also typically exposed to extreme temperatures during their operation. The SEI (Solid Electrolyte Interface) layer formed on the anode is gradually broken down at high temperatures, and hence leads to more irreversible reaction resulting in capacity loss. Similarly, the CEI (Cathode Electrolyte Interface) will also lose stability at elevated temperatures. These reactions happen on the positive and negative electrode during cycling but are generally more severe at higher temperatures due to faster kinetics. The next generation Li-ion batteries used in consumer electronics, EVs, and ESS will require significant improvements in the electrolyte component relative to the current state-of-the art of Li-ion batteries.

The shuttling of positive and negative ions between the battery electrodes is the main function of the electrolyte. Historically, researchers have focused on developing battery electrodes, and electrolyte development has been limited. Traditional Li-ion batteries used carbonate-based electrolytes with a large electrochemical window, that can transport lithium ions. These electrolytes need functional additives to passivate the anode and form a stable SEI, as well as additives for stabilizing the cathode. At the same time, there is a need to design and develop additives that allow stable and safe cycling of high voltage, high energy Li-ion batteries.

As the industry moves towards higher energy cathode materials for higher energy batteries, stable, efficient, and safe cycling of batteries in wide voltage windows is necessary. Li-ion battery electrolytes can be tuned based on their applications by addition of different co-solvents and additives. This tunability has enabled the development of different additives for high voltage stability and safety of Li-ion cells. Another aspect of high-voltage Li-ion battery electrolyte development is design and optimization of additives that stabilize the cathode by polymerizing to form a CEI. Development of such additives can enable higher energy cathode materials, and therefore improve the energy storage capabilities of Li-ion cells.

Herein, epoxide functionalized organic compounds are reported as additives for Li-ion batteries. Molecules with the said functional groups as electrolyte additives allow for the formation of a CEI that protects the cathode and electrolyte from degradation at high potentials. The cell with this additive in the electrolyte would enable safe, long cycle life, and high energy lithium ion batteries.

Korean patent KR 1535071 to Chungnam National University Industry Collaboration Foundation has reported the use of 2-Oxiraneacetonitrile as a component of an electrolyte for lithium secondary batteries. Hence, there is a need to incorporate novel additives to improve the performance of lithium ion batteries.

SUMMARY

In accordance with one aspect of the present disclosure, there is provided an electrolyte for an electrochemical energy storage device, the electrolyte includes: an epoxide functionalized organic compound additive; an aprotic organic solvent system; and a metal salt.

In accordance with another aspect of the present disclosure, there is provided an electrolyte for an electrochemical energy storage device, the electrolyte includes: an epoxide functionalized organic compound additive; an aprotic organic solvent system; a metal salt; and at least one additional additive.

In accordance with another aspect of the present disclosure, there is provided an electrochemical energy storage device, including: a cathode; an anode; a separator and an electrolyte including an epoxide functionalized organic compound additive, an aprotic organic solvent system, and a metal salt.

In accordance with another aspect of the present disclosure, there is provided an electrolyte for an electrochemical energy storage device, the electrolyte includes: an epoxide functionalized organic compound additive; an aprotic organic solvent system; a metal salt; and at least one additional additive; wherein the aprotic organic solvent includes open-chain or cyclic carbonate, carboxylic acid ester, nitrite, ether, sulfone, sulfoxide, ketone, lactone, dioxolane, glyme, crown ether, siloxane, phosphoric acid ester, phosphite, mono- or polyphosphazene or mixtures thereof.

In accordance with another aspect of the present disclosure, there is provided an electrolyte for an electrochemical energy storage device, the electrolyte includes: an epoxide functionalized organic compound additive; an aprotic organic solvent system; a metal salt; and at least one additional additive; wherein the cation of the metal salt is aluminum, magnesium or an alkali metal, such as lithium or sodium.

In accordance with another aspect of the present disclosure, there is provided an electrolyte for an electrochemical energy storage device, the electrolyte includes: an epoxide functionalized organic compound additive; an aprotic organic solvent system; a metal salt; and at least one additional additive; wherein the additional additive contains a compound containing at least one unsaturated carbon-carbon bond, carboxylic acid anhydride, sulfur-containing compound, phosphorus-containing compounds boron-containing compound, silicon-containing compound or mixtures thereof.

In accordance with another aspect of the present disclosure, there is provided an electrochemical energy storage device electrolyte including an aprotic organic solvent system; a metal salt; and at least one epoxide functionalized organic compound additive according to the formula I, II, III, IV, V or VI herein.

In accordance with another aspect of the present disclosure, there is provided an electrochemical energy storage device including a cathode; an anode; an electrolyte according to the present disclosure; and a separator.

These and other aspects of the present disclosure will become apparent upon a review of the following detailed description and the claims appended thereto.

DETAILED DESCRIPTION

Figure 1:
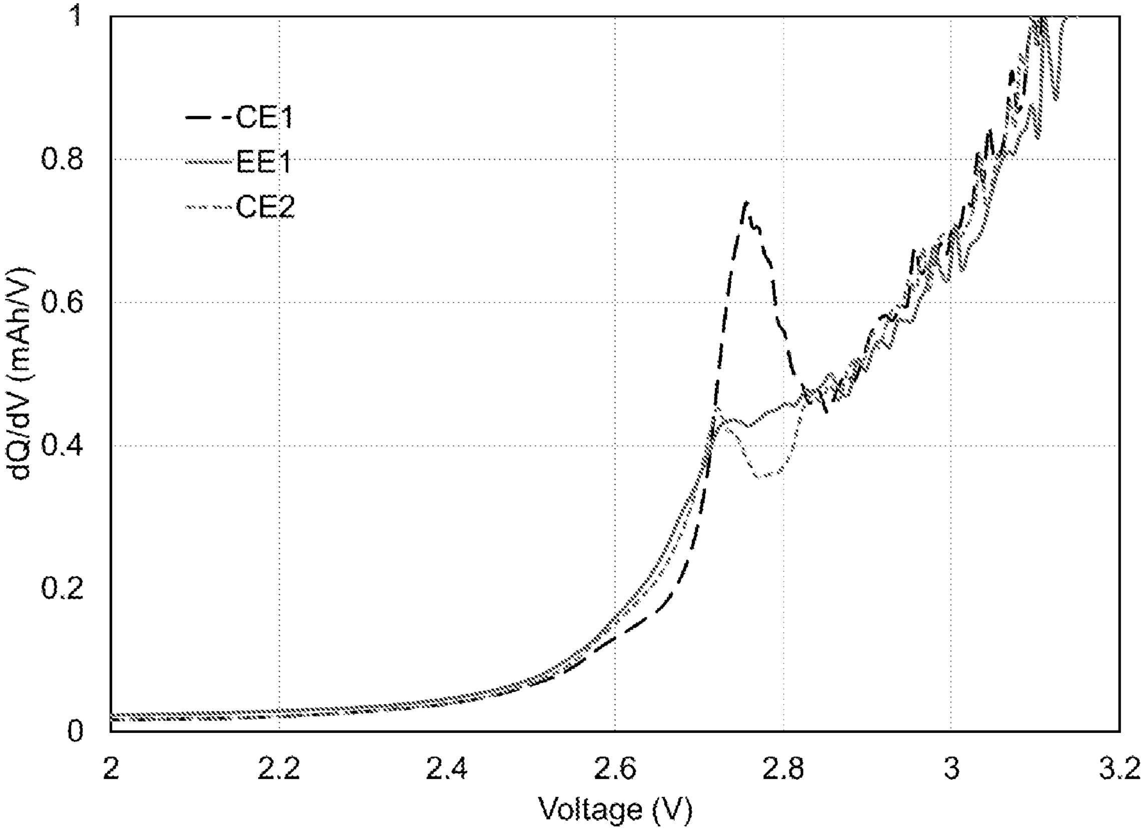
FIG. 1 is a graph showing the dQ/dV profiles of electrolytes tested in NMC811/Gr cells in accordance with the present disclosure.

The disclosed technology relates generally to lithium-ion (Li-ion) battery electrolytes. Particularly, the disclosure is directed towards epoxide functionalized organic compounds including at least one oxygen-phosphorus bond, electrolytes containing these additive materials, and electrochemical energy storage devices containing the electrolytes.

The present disclosure describes a Li-ion battery electrolyte with an electrolyte additive that can overcome cathode stability challenges in Li-ion batteries, particularly those including cathode materials with a high nickel content at high voltage. Current state-of-the-art Li-ion batteries include cathode materials that are low in nickel content and operate at high voltage or have high nickel content but operate at a low voltage. State-of-the-art electrolytes are tuned towards these conditions, and researchers have recently started focusing on enabling high nickel, high voltage battery cathodes with novel electrolyte formulations. There is a need to develop an electrolyte solution for cycling of Li-ion cells with high voltage, high nickel cathodes. The present technology is based on an innovative additive including epoxide functionalized organic compounds, that can improve the stability of high-voltage, high-energy cathodes. The electrolyte additives form a unique cathode electrolyte interface (CEI) and do not excessively passivate the cathode, when used at low weight loadings. Additionally, an improved CEI improves the high temperature performance and storage stability, with no effect at room temperature.

In an embodiment, an electrochemical energy storage device electrolyte includes a) an aprotic organic solvent system; b) a metal salt; c) an epoxide functionalized organic compound material additive and d) at least one additional additive.

In an aspect of the disclosure, the molecular structure of at least six epoxide functionalized organic compound additives according to the formulas I, II, III, IV, V, or VI are depicted below:

(I)

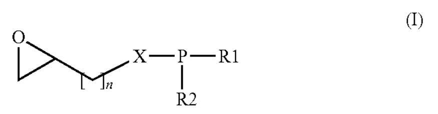

(II)

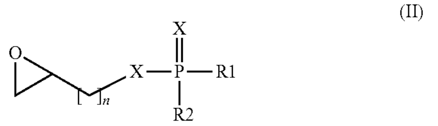

(III)

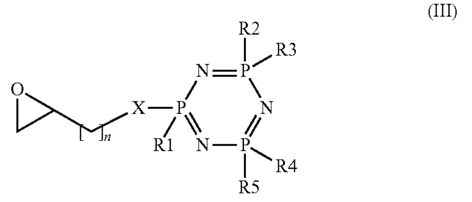

(IV)

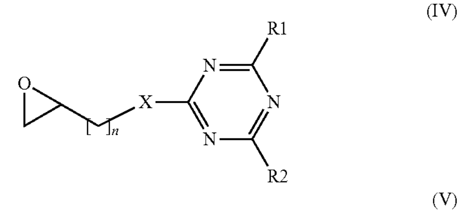

(V)

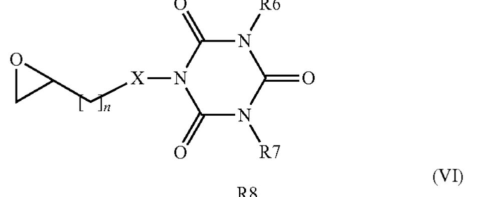

(VI)

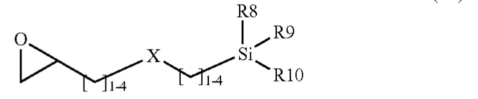

wherein X is Oxygen or Sulfur;

n is an integer ranging from 1 to 8;

R1, R2, R3, R4, and R5 are independently a halogen, oxygen or sulfur atom, further bonded to $C_1$-$C_{12}$ substituted or unsubstituted alkyl groups, or $C_6$-$C_{14}$ aryl groups, independently $C_1$-$C_{12}$ substituted or unsubstituted alkyl groups, or $C_6$-$C_{14}$ aryl groups;

wherein any hydrogen or carbon atom can be unsubstituted or can be independently substituted with an epoxide, halogen, alkyl, alkoxy, perfluorinated alkyl, silyl, siloxy, silane, sulfoxide, amide, azo, ether, or thioether group or combinations thereof;

R6 and R7 are independently oxygen or sulfur atoms, further bonded to $C_1$-$C_{12}$ substituted or unsubstituted alkyl groups, or $C_6$-$C_{14}$ aryl groups, independently $C_1$-$C_{12}$ substituted or unsubstituted alkyl groups, or $C_6$-$C_{14}$ aryl groups;

wherein any hydrogen or carbon atom can be unsubstituted or can be independently substituted with an epoxide, halogen, alkyl, alkoxy, perfluorinated alkyl, silyl, siloxy, silane, sulfoxide, amide, azo, ether, or thioether group or combinations thereof; and R8, R9, and R10 are independently selected from hydrogen, $C_1$-$C_{12}$ alkyl groups, heteroalkyl groups, perfluoroalkyl groups, alkenyl groups, aryl or alkoxy groups.

Specific examples of molecules according to the disclosure are listed below:

(I)

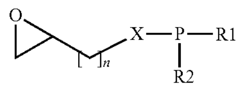

R═F, Glycidyl difluoro phosphite

R═$CH_3$, Glycidyl dimethyl phosphite

R═$CF_3$, Glycidyl bis(trifluoromethyl) phosphite

R═$CH_2CH_3$, Glycidyl diethyl phosphite

R═$CH_2CF_3$, Glycidyl bis(2,2,2-trifluoroethyl) phosphite

R═$CF_2CF_3$, Glycidyl bis(perfluoroethyl) phosphite

R═$CH(CH_3)_2$, Glycidyl diisopropyl phosphite

R═$CH(CF_3)_2$, Glycidyl bis(1,1,1,3,3,3-hexafluoro-2-propyl) phosphite (II)

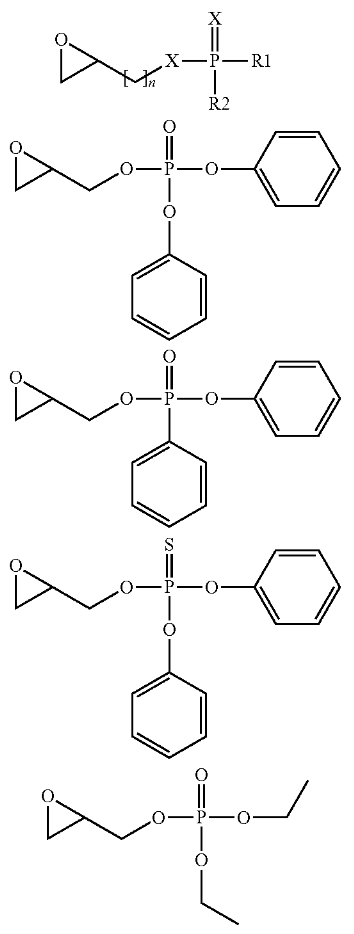

-continued (III)

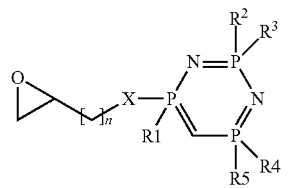

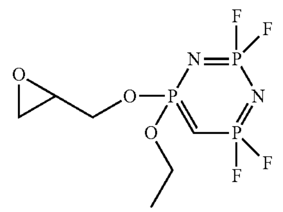

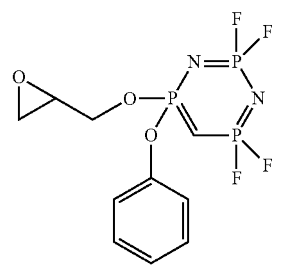

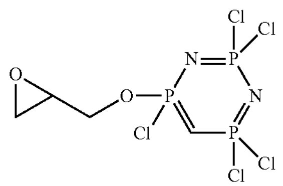

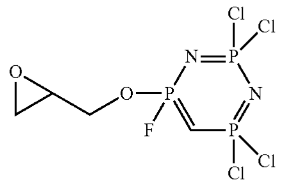

(IV)

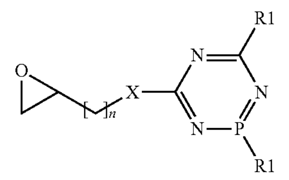

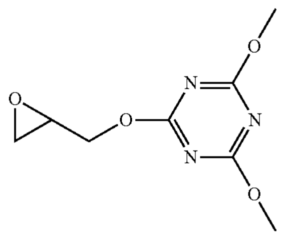

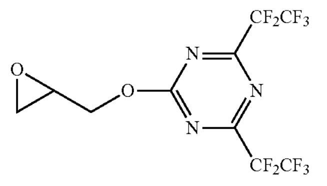

-continued

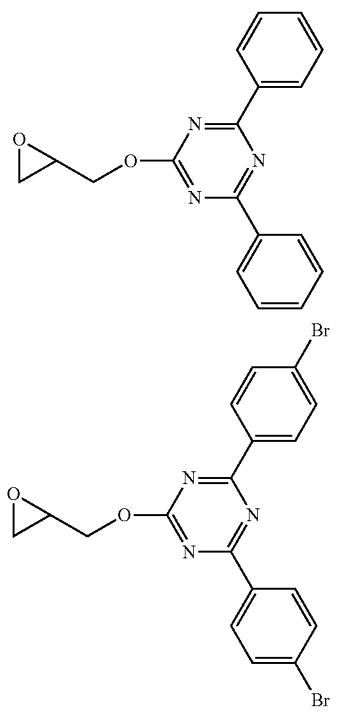

(V)

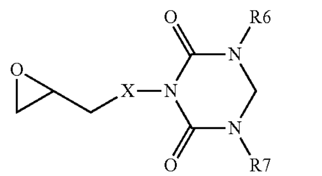

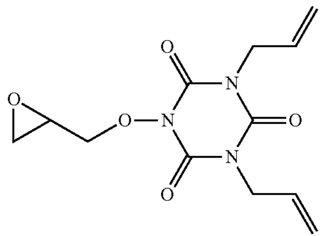

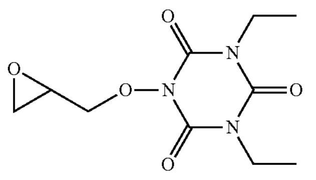

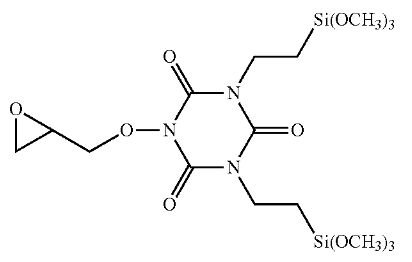

-continued

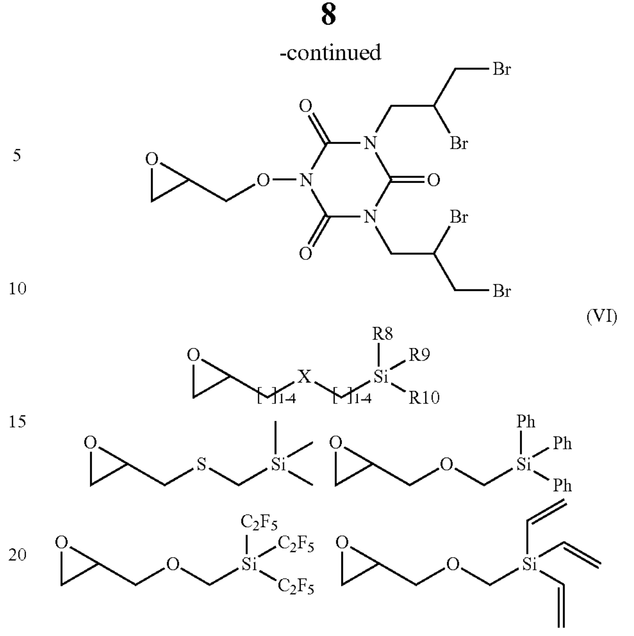

(VI)

These examples are only an illustration and are not meant to limit the disclosure of claims to follow.

The addition of epoxide functionalized organic compounds into the Li-ion battery system allows for the polymerization of said epoxide at high temperature or oxidation on the surface of the cathode. The resulting polyether film coordinates with the cathode material, which suppresses further oxidative decomposition of the rest of the electrolyte components that occurs otherwise in contact with the cathode material. The inclusion of a phosphorus-oxygen bond can insure good coordination with high nickel, high energy cathode materials.

The disclosure also includes a method for synthesizing the epoxide functionalized organic compounds, and the use of such molecules in lithium ion battery electrolytes. These molecules impart greater stability to the electrolytes and cathodes operating at higher potentials.

In an aspect of the disclosure, the electrolyte further includes a lithium salt in a range of from 10% to 30% by weight. A variety of lithium salts may be used, including, for example, $Li(AsF_6)$; $Li(PF_6)$; $Li(CF_3CO_2)$; $Li(C_2F_5CO_2)$; $Li(CF_3SO_3)$; $Li[N(CP_3SO_2)_2]$; $Li[C(CF_3SO_2)_3]$; $Li[N(SO_2C_2F_5)_2]$; $Li(ClO_4)$; $Li(BF_4)$; $Li(PO_2F_2)$; $Li[PF_2(C_2O_4)_2]$; $Li[PF_4C_2O_4]$; lithium alkyl fluorophosphates; $Li[B(C_2O_4)_2]$; $Li[BF_2C_2O_4]$; $Li_2[Bi_2Z_{12-j}H_j]$; $Li_2[B_{10}X_{10-j'}H_{j'}]$; or a mixture of any two or more thereof, wherein Z is independent at each occurrence a halogen, j is an integer from 0 to 12 and j' is an integer from 1 to 10.

In an aspect of the disclosure, the electrolyte further includes an aprotic organic solvent system selected from open-chain or cyclic carbonate, carboxylic acid ester, nitrite, ether, sulfone, sulfoxide, ketone, lactone, dioxolane, glyme, crown ether, siloxane, phosphoric acid ester, phosphite, mono- or polyphosphazene or mixtures thereof in a range of from 60% to 90% by weight.

Examples of aprotic solvents for generating electrolytes include but are not limited to dimethyl carbonate, ethyl methyl carbonate, diethyl carbonate, methyl propyl carbonate, ethyl propyl carbonate, dipropyl carbonate, propylene carbonate, ethylene carbonate, fluoroethylene carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, methyl propionate, ethyl propionate, butyl propionate, dimethoxyethane, triglyme, dimethylvinylene carbonate, tetraethyleneglycol, dimethyl ether, polyethylene glycols, triphenyl phosphate, tributyl phosphate, hexafluorocyclotriphosphazene, 2-Ethoxy-2,4,4,6,6-pentafluoro-1,3,5,2-5,4-5,6-5 triazatriphosphinine, triphenyl phosphite, sulfolane, dimethyl sulfoxide, ethyl methyl sulfone, ethylvinyl sulfone, allyl methyl sulfone, divinyl sulfone, fluorophenylmethyl sulfone and gamma-butyrolactone.

In an aspect of the disclosure, the electrolytes further include at least one additional additive to protect the electrodes and electrolyte from degradation. Thus, electrolytes of the present technology may include an additive that is reduced or polymerized on the surface of an electrode to form a passivation film on the surface of the electrode. In some embodiments, electrolytes of the present technology further include mixtures of the two types of additives.

In an embodiment, an additive is a substituted or unsubstituted linear, branched, or cyclic hydrocarbon including at least one oxygen atom and at least one aryl, alkenyl or alkynyl group. The passivating film formed from such additives may also be formed from a substituted aryl compound or a substituted or unsubstituted heteroaryl compound where the additive includes at least one oxygen atom.

Representative additives include glyoxal bis(diallyl acetal), tetra(ethylene glycol) divinyl ether, 1,3,5-triallyl-1,3,5-triazine-2,4,6(1H,3H,5H)-trione, 1,3,5,7-tetravinyl-1,3,5,7-tetramethylcyclotetrasiloxane, 2,4,6-triallyloxy-1,3,5-triazine, 1,3,5-triacryloylhexahydro-1,3,5-triazine, 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2-amino-3-vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2-vinyloxetane, 2-vinyloxy-cyclopropanone, 3-(N-vinylamino)cyclohexanone, 3,5-divinyl furoate, 3-vinylazetidin-2-one, 3 vinylaziridin-2-one, 3-vinylcyclobutanone, 3-vinylcyclopentanone, 3-vinyloxaziridine, 3-vinyloxetane, 3-vinylpyrrolidin-2-one, 2-vinyl-1,3-dioxolane, acrolein diethyl acetal, acrolein dimethyl acetal, 4,4-divinyl-3-dioxolan-2-one, 4-vinyltetrahydropyran, 5-vinylpiperidin-3-one, allylglycidyl ether, butadiene monoxide, butyl-vinyl-ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, β-vinyl-γ-butyrolactone or a mixture of any two or more thereof. In some embodiments, the additive may be a cyclotriphosphazene that is substituted with F, alkyloxy, alkenyloxy, aryloxy, methoxy, allyloxy groups, sulfonic acid groups, or combinations thereof. For example, the additive may be a (divinyl)-(methoxy)(trifluoro)cyclotriphosphazene, (trivinyl)(difluoro)(methoxy) cyclotriphosphazene, (vinyl)(methoxy)(tetrafluoro)cyclotriphosphazene, (aryloxy)(tetrafluoro)(methoxy) cyclotriphosphazene, (methyl sulfonyl) cyclotriphosphazene, or (diaryloxy)(trifluoro)(methoxy) cyclotriphosphazene compounds or a mixture of two or more such compounds.

In some embodiments the additive is a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride or the mixtures thereof. In some embodiments, the additive is vinyl carbonate, vinyl ethylene carbonate, or a mixture of any two or more such compounds. Further, the additive is present in a range of from 0.01% to 10% by weight.

In some embodiments the additive is a fully or partially halogenated phosphoric acid ester compound, an ionic liquid, or mixtures thereof. The halogenated phosphoric acid ester may include 4-fluorophenyldiphenylphosphate, 3,5-difluorophenyldiphenylphosphate, 4-chlorophenyldiphenylphosphate, trifluorophenylphosphate, heptafluorobutyldiphenylphosphate, trifluoroethyldiphenylphosphate, bis(trifluoroethyl)phenylphosphate, and phenylbis(trifluoroethyl)phosphate. The ionic liquids may include tris(N-ethyl-N-methylpyrrolidinium)thiophosphate bis(trifluoromethylsulfonyl)imide, tris(N-ethyl-N-methylpyrrolidinium) phosphate bis(trifluoromethylsulfonyl)imide, tris(N-ethyl-N-methylpiperidinium)thiophosphate bis(trifluoromethylsulfonyl)imide, tris(N-ethyl-N-methylpiperidinium)phosphate bis(trifluoromethylsulfonyl)imide, N-methyl-trimethylsilylpyrrolidinium bis(trifluoromethylsulfonyl)imide, N-methyl-trimethylsilylpyrrolidinium hexafluorophosphate. Further, the additive is present in a range of 0.01% to 10% by weight.

In another aspect of the disclosure, an electrochemical energy storage device is provided that includes a cathode, an anode and an electrolyte including an ionic liquid as described herein. In one embodiment, the electrochemical energy storage device is a lithium secondary battery. In some embodiments, the secondary battery is a lithium battery, a lithium-ion battery, a lithium-sulfur battery, a lithium-air battery, a sodium ion battery, or a magnesium battery. In some embodiments, the electrochemical energy storage device is an electrochemical cell, such as a capacitor. In some embodiments, the capacitor is an asymmetric capacitor or supercapacitor. In some embodiments, the electrochemical cell is a primary cell. In some embodiments, the primary cell is a lithium/$MnO_2$ battery or Li/poly(carbon monofluoride) battery.

In an embodiment, a secondary battery is provided including a positive and a negative electrode separated from each other using a porous separator and the electrolyte described herein.

Suitable cathodes include those such as, but not limited to, a lithium metal oxide, spinel, olivine, carbon-coated olivine, $LiFePO_4$, $LiCoO_2$, $LiNiO_2$, $LiMn_{0.5}Ni_{0.5}O_2$, $LiMn_{0.3}Co_{0.3}Ni_{0.3}O_2$, $LiMn_2O_4$, $LiFeO_2$, $LiNi_xCo_yMet_2O_2$, $AnB_2(XO_4)_3$, vanadium oxide, lithium peroxide, sulfur, polysulfide, a lithium carbon monofluoride (also known as $LiCF_x$) or mixtures of any two or more thereof, where Met is Al, Mg, Ti, B, Ga, Si, Mn or Co; A is Li, Ag, Cu, Na, Mn, Fe, Co, Ni, Cu or Zn; B is Ti, V, Cr, Fe or Zr; X is P, S, Si, W or Mo; and wherein $0 \le x \le 0.3$, $0 \le y \le 0.5$, and $0 \le z \le 0.5$ and $0 \le n^1 \le 0.3$. According to some embodiments, the spinel is a spinel manganese oxide with the formula of $Li_{1+x}Mn_{2-z}Met'''_yO_{4-m}X'_n$, wherein Met''' is Al, Mg, Ti, B, Ga, Si, Ni or Co; X' is S or F; and wherein $0 \le x \le 0.3$, $0 \le y \le 0.5$, $0 \le z \le 0.5$, $0 \le m \le 0.5$ and $0 \le n \le 0.5$. In other embodiments, the olivine has a formula of $L_{i+x}Fe_{1z}Met''_{y}PO_{4-m}X'_{n}$, wherein Met" is Al, Mg, Ti, B, Ga, Si, Ni, Mn or Co; X is S or F; and wherein $0 \le x \le 0.3$, $0$ $0 \le y \le 0.5$, $0 \le z \le 0.5$, $0 \le m \le 0.5$ and $0 \le n \le_{0.5}$.

Suitable anodes include those such as lithium metal, graphitic materials, amorphous carbon, carbon nanotubes, $Li_4Ti_5O_{12}$, tin alloys, silicon, silicon alloys, intermetallic compounds, or mixtures of any two or more such materials. Suitable graphitic materials include natural graphite, artificial graphite, graphitized meso-carbon microbeads (MCMB) and graphite fibers, as well as any amorphous carbon materials. In some embodiments, the anode and cathode electrodes are separated from each other by a porous separator.

The separator for the lithium battery often is a microporous polymer film. Examples of polymers for forming films include polypropylene, polyethylene, nylon, cellulose, nitrocellulose, polysulfone, polyacrylonitrile, polyvinylidene fluoride, polybutene, or copolymers or blends of any two or more such polymers. In some instances, the separator is an electron beam-treated micro-porous polyolefin separator. The electron treatment can increase the deformation temperature of the separator and can accordingly enhance thermal stability at high temperatures. Additionally, or alternatively, the separator can be a shut-down separator. The shut-down separator can have a trigger temperature above about 130° C. to permit the electrochemical cells to operate at temperatures up to about 130° C.

The disclosure will be further illustrated with reference to the following specific examples. It is understood that these examples are given by way of illustration and are not meant to limit the disclosure or the claims to follow.

Example 1—Synthesis of oxiran-2-ylmethyl diphenylphosphate

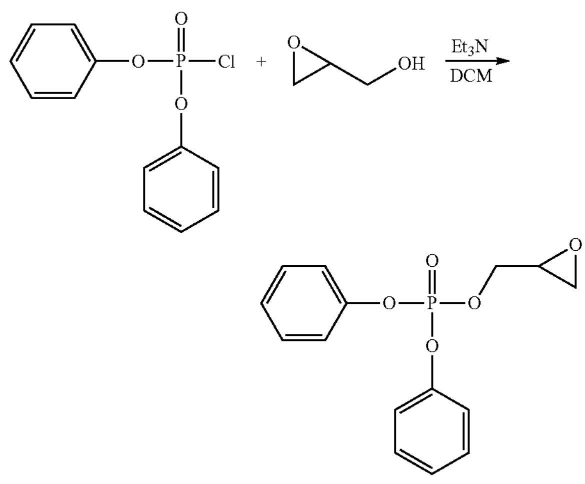

To a 100 ml 3-neck RBF equipped with a stir bar, a thermocouple, a water-cooled condenser, a $N_2$ inlet was placed glycidol in 6 ml dicholoromethane (DCM). $Et_3N$ in 2 ml DCM was poured into the flask. Diphenyl phosphoryl chloride in 3 ml DCM was added to the flask. A minor white smoke was observed and a slightly exotherm to 24.1° C. was also seen. The reaction mixture was stirred at room temperature (RT) for overnight. Some white solid precipitate was formed after the reaction mixture was stirred at RT for about 15 min. Deionized (DI) $H_2O$ was poured into the flask to dissolve the white solid precipitate. The whole mixture was poured into a separatory funnel. The organic phase was extracted into DCM twice, separated, combined, dried over MgSO4. Solvent was then removed on a rotavapor. 1.8 g crude oil was collected. The crude oil was purified by column chromatography on silica gel eluting with DCM to give a pure colorless oil, 0.8 g.

Example 2—Synthesis of Monooxiranemethyl pentachlorophosphazene

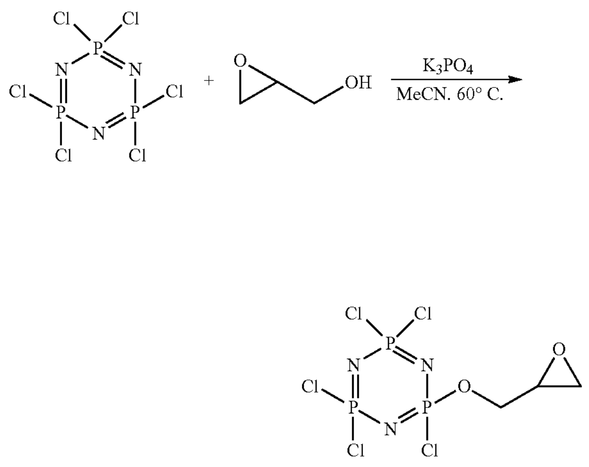

To a 100 ml 3-neck RBF equipped with a stir bar, a thermocouple, a water-cooled condenser, a $N_2$ inlet was placed glycidol in 12 ml MeCN. $K_3PO_4$ was poured into the flask. $K_3PO_4$ did not dissolve in MeCN. While stirring at rt., phosphonitrilic chloride trimer was poured into the flask. The reaction mixture was heated to 60° C. and was stirred at 60° C. for one day. The reaction mixture turned pink while stirring at 60° C. MeCN was then removed on a rotavapor and rest of the mixture was transferred into a separatory funnel. DI. $H_2O$ and DCM was poured into the funnel. The organic phase was extracted into DCM twice, separated, combined, dried over MgSO4. Solvent was removed on a rotavapor.

Yield: yellow oil, 1.8 g.

Example 3—Synthesis of Glycidyl Difluoro Phosphite

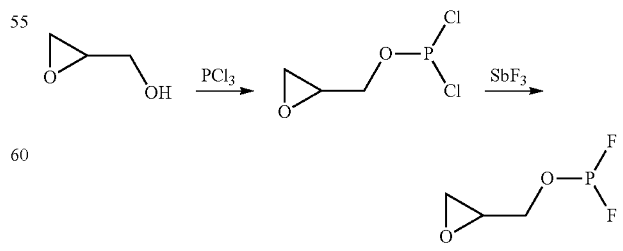

Step A: Synthesis of glycidyldichloro-phosphite

| Reagent | MW | Equiv | Mol | Mass (g) | Density | Volume (mL) | Conc | Yield (calc) |
|---|---|---|---|---|---|---|---|---|
| glycidol | 74.08 | 1.00 | 0.067 | 5.0 | 1.117 | 4.5 | | |
| PCl3 | 137.33 | 1.05 | 0.071 | 9.7 | 1.570 | 6.2 | | |
| DCM | | | | 29.5 | 1.326 | 22.2 | 50% | |
| glycidyldichloro-phosphite | 174.91 | 1.00 | | | | | | 12.4 |
| HCl | 36.5 | 1.00 | 0.067 | | | | | 2.5 |

To a 250 mL 3-neck flask equipped with a magnetic stirring bar, $N_2$ inlet, HCl gas outlet to a base bath and thermocouple was added phosphorous-trichloride and DCM (20 mL). The flask was placed into an ice water bath. While stirring at 5° C., a solution of glycidol in DCM (5 mL) was slowly added by syringe over a 4-hour period. An exotherm under 15.0° C. was maintained and no gas evolution was observed. The mixture slowly returned to RT and stirred for 1 hour and the solvent was stripped by rotary evaporation. Crude yield: colorless oil, 12.2 g, (>99%). The oil was distilled under vacuum: pot, 120° C.; vapors, 75° C.; p, 1.0 mmHg.

Yield: colorless oil, 6.8 g, (55%).

Step B: Synthesis of glycidyldifluoro-phosphite

| Reagent | MW | Equiv | Mol | Mass (g) | Density | Volume (mL) | Conc | Yield (calc) |
|---|---|---|---|---|---|---|---|---|
| glycidyldichloro-phosphite | 174.91 | 1.00 | 0.039 | 6.8 | | #DIV/0! | | |
| SbF3 | 178.76 | 0.67 | 0.026 | 4.7 | 4.380 | 1.1 | | |
| hexane | | | | 19.1 | 0.659 | 29.0 | 60% | |
| glycidyldifluoro-phosphite | 142.01 | 1.00 | | | | | | 5.5 |
| SbCl3 | 228.11 | 1.00 | 0.039 | | | | | 5.9 |

To a 250 mL 3-neck flask equipped with a magnetic stirring bar, $N_2$ inlet and thermocouple was added antimony (III)fluoride and hexane (25 mL). The flask was placed into an ice water bath. While stirring at 5° C., a solution of Step A product in hexane (5 mL) was slowly added by syringe. A mild exotherm was observed. The mixture slowly returned to RT and stirred for 2 hours. A dense yellow oil was deposited on the bottom (presumably $SbCl_3$). The solvent was separated from the yellow oil and stripped by rotary evaporation. Crude yield: colorless oil, 4.4 g, (80%). The oil was flushed under nitrogen for 30 min and transferred to a dry vial in the glovebox.

Example 4—Electrolyte Formulations for NMC811/Gr Cells

Electrolyte formulations were prepared in a dry argon filled glovebox by combining all electrolyte components in glass vials by stirring for 24 hours to ensure complete dissolution of all solids. The epoxide-based additive materials are added to a base electrolyte formulation comprising a 3:7 by volume mixture of ethylene carbonate, "EC", ethyl methyl carbonate, "EMC", and 1 M lithium hexafluorophosphate, "LiPF6", as a $Li^+$ ion conducting salt, dissolved therein. Vinylene carbonate "VC" is used as standard anode SEI forming additive, and 1,3-propanesultone "PaS" is used as a comparative example. The electrolyte formulations are listed in Table A.

TABLE A

| Electrolyte Formulations | | |
|---|---|---|
| Electrolyte | Base Formulation | Additive Weight (%) |
| Comparative Example 1 (CE1) | 1.0M $LiPF_6$ in EC:EMC (3:7) | VC: 2% |
| Comparative Example 2 (CE2) | 1.0M $LiPF_6$ in EC:EMC (3:7) | VC: 2%, PaS: 0.5% |
| Embodiment Example 1 (EE1) | 1.0M $LiPF_6$ in EC:EMC (3:7) | VC: 2%, Example 3: 1% |

Example 5—Electrochemical Cell Data for NMC811/Gr Cells

The electrolyte formulations prepared are used as electrolytes in 1.8 Ah Li-ion pouch cells comprising NMC811 cathode active material and graphite as the anode active material. The cell operation voltage window is 4.2-2.8 V. In each cell, 6 grams of electrolyte was added and allowed to soak in the cell for 1 hour. The cells were vacuum sealed and allowed to rest at room temperature for 24 hours. The cells were then charged to 3.7 V at C/50 rate, stored in 60° C. storage for 12 hours to allow for the epoxide ring opening, before degassing, followed by vacuum sealing. After degassing, the cells were charged and discharged twice between 4.2 to 2.8 V at C/10 rate, and the results are summarized in Table B. The Initial Capacity Loss (iCL) is calculated based on the first cycle Coulombic Efficiency, and the reported formation discharge capacity is for the last cycle of formation. AC-IR is the measured internal resistance at 1 kHz frequency. It is evident that the addition of 1 wt. % epoxide-based additive increases the AC-IR, and hence reduced the initial discharge capacity compared to comparative examples. However, the dQ/dV profiles in FIG. 1 are indicative of a unique SEI layer on the anode surface compared to Comparative examples. The dQ/dV profile for EE1 shows a unique broad reaction shoulder at 2.75 V, which is absent in cells with other electrolytes.

TABLE B

| Initial Cell Data for NMC811/Gr cells | | | |
|---|---|---|---|
| Electrolyte | Initial Capacity Loss (%) | Formation Discharge Capacity (Ah) | AC-IR (mΩ) |
| CE1 | 15.10 | 1.77 | 13.15 |
| CE2 | 14.45 | 1.77 | 13.40 |
| EE1 | 14.95 | 1.76 | 13.89 |

The cells were then subjected to a high temperature storage test. The cells were charged to 100% state-of-charge at 4.2 V and placed in an environmental chamber set to 60° C. Every two weeks, the AC-IR, thickness, and capacity recovery of the cells was measured. The results are summarized in Table C. As can be seen in Table C, all cells demonstrated an increase in internal resistance, some swelling attributable to gas generation and loss of capacity. However, the exemplary example EE1 demonstrates improvement in all three key factors relative to the comparative example, especially in the suppression of rising cell thickness and capacity recovery.

TABLE C

| Storage Data in NMC811/Gr cells | | | | | | |
|---|---|---|---|---|---|---|
| | AC-IR (%) | | Cell thickness (%) | | Capacity Recovery (%) | |
| Electrolyte | Week 0 | Week 4 | Week 0 | Week 4 | Week 0 | Week 4 |
| CE1 | 100.0 | 181.6 | 100.0 | 115.2 | 100.0 | 83.1 |
| CE2 | 100.0 | 167.5 | 100.0 | 109.1 | 100.0 | 86.4 |
| EE1 | 100.0 | 160.4 | 100.0 | 105.1 | 100.0 | 88.3 |

Example 6—Electrolyte Formulations for NMC622/Gr Cells

Electrolyte formulations were prepared in a dry argon filled glovebox by combining all electrolyte components in glass vials by stirring for 24 hours to ensure complete dissolution of all solids. The epoxide-based additive materials are added to a base electrolyte formulation comprising a 3:7 by volume mixture of ethylene carbonate, "EC", ethyl methyl carbonate, "EMC", and 1 M lithium hexafluorophosphate, "LiPF6", as a $Li^+$ ion conducting salt, dissolved therein. Vinylene carbonate "VC" and fluoroethylene carbonate "FEC" are used as standard anode SEI forming additives. The electrolyte formulations are listed in Table D.

TABLE D

| Electrolyte Formulations | | |
|---|---|---|
| Electrolyte | Base Formulation | Additive Weight % |
| Comparative Example 3 (CE3) | 1.0M $LiPF_6$ in EC:EMC (3:7) | VC: 1%, FEC: 1% |
| Embodiment Example 2 (EE2) | 1.0M $LiPF_6$ in EC:EMC (3:7) | VC: 1%, FEC: 1%, (3-Glycidoxypropyl)trimethoxysilane: 1% |

Example 7—Electrochemical Cell Data for NMC622/Gr Cells

Figure 2:
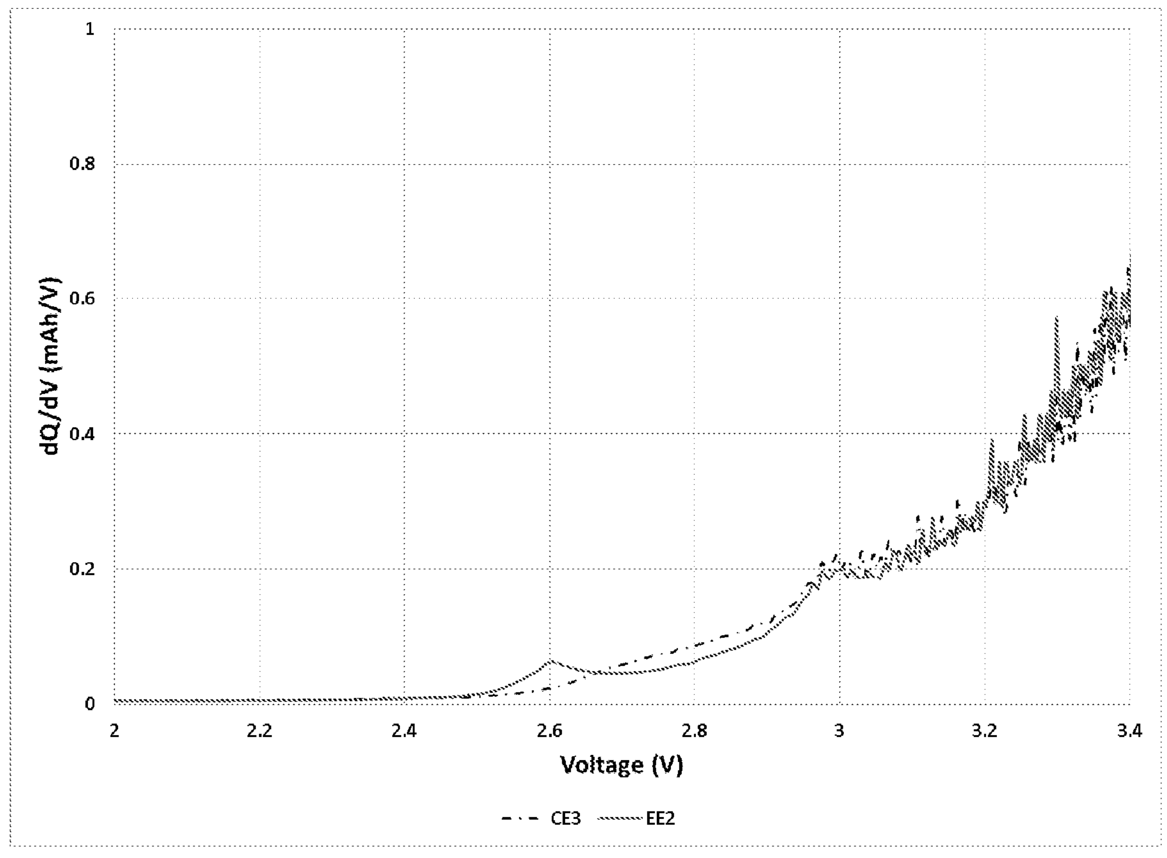
FIG. 2 is a graph showing the dQ/dV profiles of electrolytes tested in NMC622/Gr cells in accordance with the present disclosure.

The electrolyte formulations prepared are used as electrolytes in 200 mAh Li-ion pouch cells comprising lithium nickel manganese cobalt oxide (NMC622) cathode active material and graphite as the anode active material. In each cell, 0.9 mL of electrolyte formulation was added and allowed to soak in the cell for 1 hour. The cells are vacuum sealed, and primary charged before wetting at 25° C. for 10 hours. The cells were then charged to 3.8 V at C/25 rate before degassing, followed by vacuum sealing. After degassing, the cells were charged and discharged twice between 4.45 to 3.0 V at C/10 rate, and the results are summarized in Table E. The Initial Capacity Loss (iCL) is calculated based on the first cycle Coulombic Efficiency (CE), and the reported discharge capacity is for the last cycle of formation at C/5 rate. AC-IR is the measured internal resistance at 1 kHz frequency. With addition of 1 wt. % epoxide-based additive, the initial cell data is very comparable to reference electrolyte. In the dQ/dV profile in FIG. 2 however, an early reaction is seen with the epoxide additive according to the present disclosure.

TABLE E

| Initial Cell Data for NMC622/Gr cells | | | |
|---|---|---|---|
| Electrolyte | Initial Capacity Loss (%) | Formation Discharge Capacity (mAh) | AC-IR (mΩ) |
| CE3 | 12.57 | 203.5 | 97.49 |
| EE2 | 13.26 | 201.6 | 98.47 |

Figure 3:
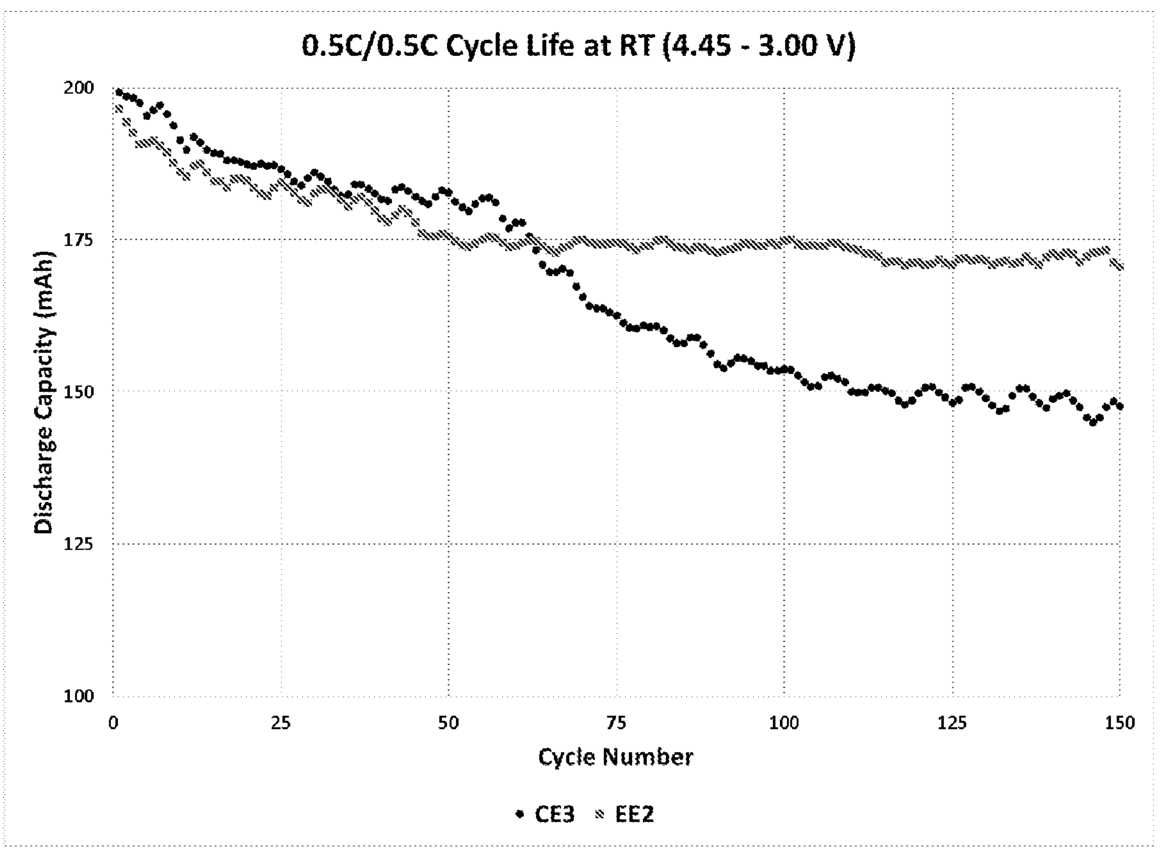
FIG. 3 shows the room temperature cycle life characteristics of electrolytes tested in NMC622/Gr cells according to the present disclosure.
Figure 4:
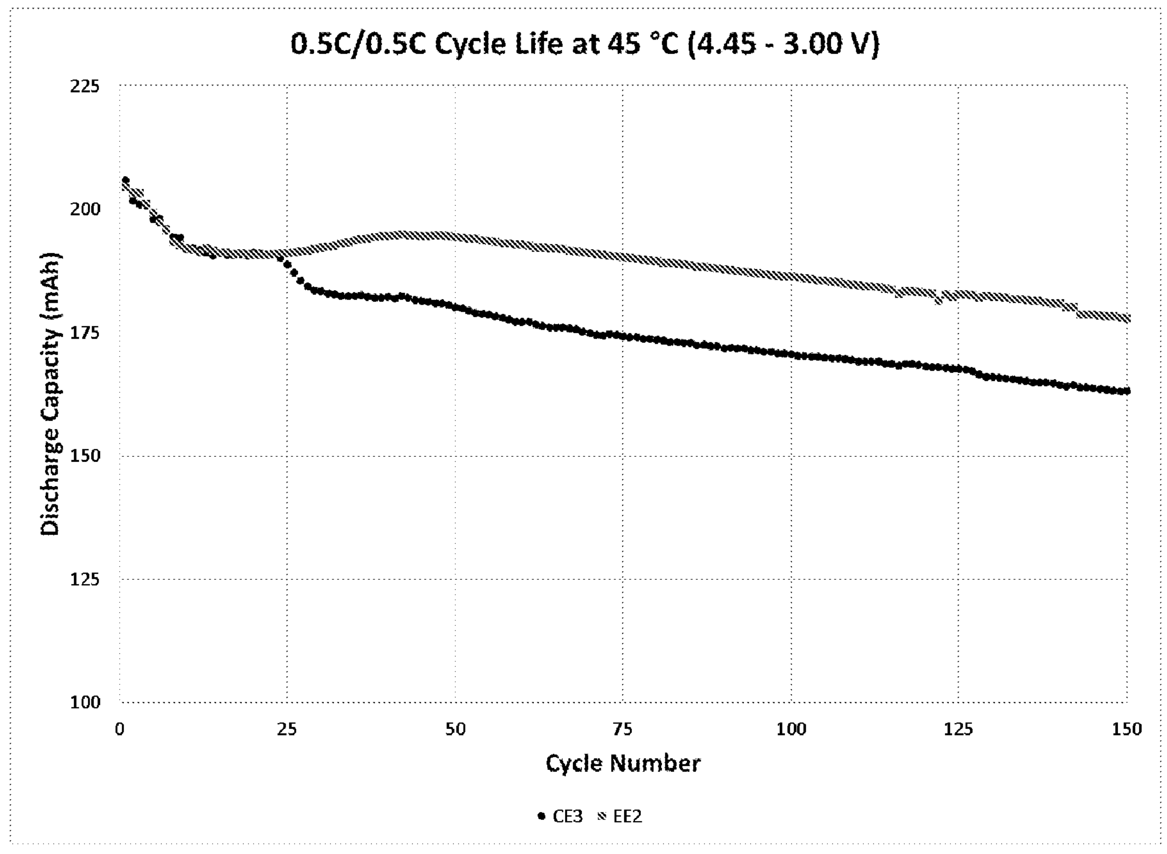
FIG. 4 shows the 45° C. cycle life characteristics of electrolytes tested in NMC622/Gr cells according to the present disclosure.

As seen by the data in FIG. 3 and FIG. 4, cells with EE2 show stable cycle life characteristics compared to cells with CE3 during rt. and 45° C. cycling. Cells with CE3 experience fast capacity fade even at RT due to higher cut-off voltage, but cells with EE2 are more stable. Hence, the epoxide-based molecules according to the present disclosure improve the stability of high voltage cathodes operated at higher cut-off voltages.

Example 8—Electrolytes for NMC811/Gr Cells

The epoxide functional additive is added to a base electrolyte formulation comprising a 3:7 by weight mixture of ethylene carbonate, "EC" and ethyl methyl carbonate, "EMC", and 1 M lithium hexafluorophosphate, "LiPF6", as a $Li^+$ ion conducting salt, dissolved therein. Comparative Example 4 (CE4) consists of the base formulation. Embodiment Example 4 (EE4) uses a representative example molecule as per the present disclosure. The electrolyte components and additives used in are summarized in Table F.

TABLE F

| Electrolyte Formulations for NMC811/Gr cells | | |
|---|---|---|
| Electrolyte | CE4 | EE4 |
| Base Formulation | 1.0M $LiPF_6$ in EC/EMC (3/7 wt. %) | 1.0M $LiPF_6$ in EC/EMC (3/7 wt. %) |
| Embodiment Example 1 | | 1.0% |

Embodiment Example 1 is the following structure:

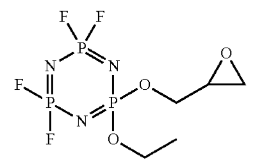 [SMILES: CCOP1(OCC2CO2)=NP(F)(F)=NP(F)(F)=N1]

Example 9—Electrochemical Cell Data for NMC811/Gr Cells

Figure 5:
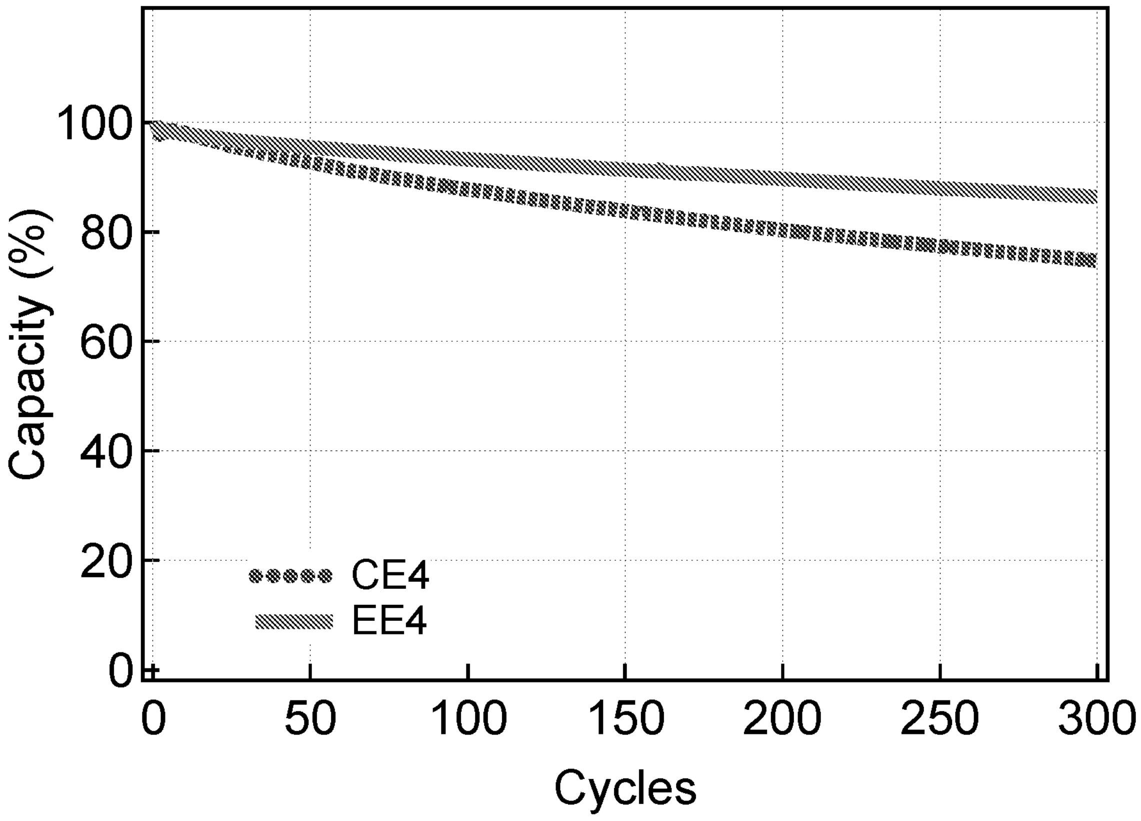
FIG. 5 shows the cycle life characteristics of 1.6 Ah NMC811/Gr cells at 25° C. during cycling at 1 C rate for charging and discharging.

The electrolyte formulations prepared are used as electrolytes in 1.6 Ah Li-ion pouch cells comprising NMC811 cathode active material and artificial graphite as the anode active material. The cell operation voltage window is 4.2-2.7 V. In each cell, 6 g of electrolyte was added and allowed to soak in the cell for 1 hour. The cells were vacuum sealed and allowed to rest at room temperature for 24 hours. The cells were then charged to 3.7 V at C/25 rate before degassing, followed by vacuum sealing. After degassing, the cells were charged and discharged twice between 4.2 to 2.7 V at C/10 rate, and then charged and discharged three hundred times between 4.2 to 2.7 Vat 1 C rate at 25° C. FIG. 5 shows the cycle life characteristics of 1.6 Ah NMC811/Gr cells at 25° C. during cycling at 1 C rate for charging and discharging. Here, it is clear that addition of an epoxide functional additive greatly improves the cyclability of NMC811/Gr cells relative to the comparative example. The capacity retention after 300 cycles is higher for cells with EE4 compared to CE4. This data is summarized in Table G.

TABLE G

Data after 300 Cycles in NMC811/Gr cells

| Electrolyte | Initial Capacity (Ah) | Retention (%) at 300 cycles |
|---|---|---|
| CE4 | 1.58 | 74.7 |
| EE4 | 1.66 | 86.4 |

Example 10—Electrolytes for NMC811/Gr Cells

The epoxide additive is added to a base electrolyte formulation comprising a 3:7 by weight mixture of ethylene carbonate, "EC" and ethyl methyl carbonate, "EMC", and 1 M lithium hexafluorophosphate, "LiPF6", as a $Li^+$ ion conducting salt, dissolved therein. Comparative Example 101 (CE101) consists of the base formulation with vinylene carbonate "VC", and Comparative Example 102 (CE102) has Propane Sultone "PaS" with VC. Embodiment Example 101 (EE101) uses a representative example molecule as per the present disclosure in addition to VC. The electrolyte components and additives are summarized in Table H.

TABLE H

Electrolyte Formulations for NMC811/Gr cells

| Electrolyte | Base Formulation | Additive Weight % |
|---|---|---|
| Comparative Example 101 (CE101) | 1.0M $LiPF_6$ in EC:EMC (3:7) | VC: 2% |
| Comparative Example 102 (CE102) | 1.0M $LiPF_6$ in EC:EMC (3:7) | VC: 2%<br>PaS: 0.5% |
| Embodiment Example 101 (EE101) | 1.0M $LiPF_6$ in EC:EMC (3:7) | VC: 2%<br>Example 2: 0.5% |

Example 11—Electrochemical Cell Data for NMC811/Gr Cells

Figure 6:
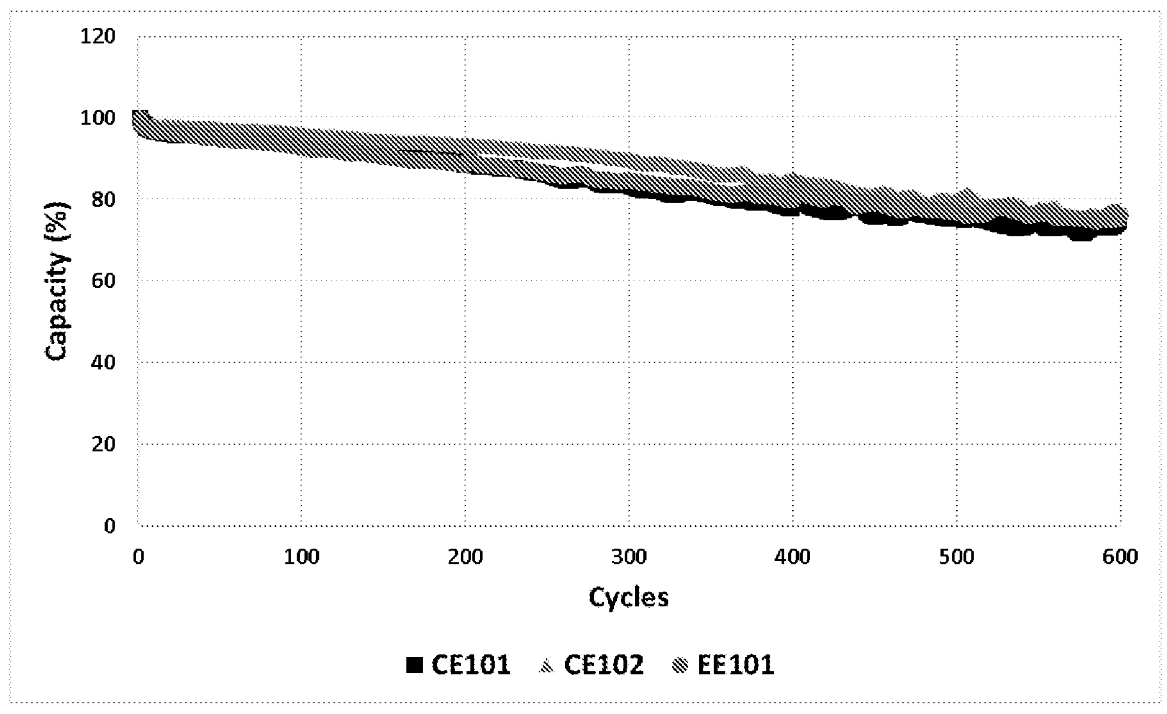
FIG. 6 is a graph of capacity retention for 5.0 Ah NMC811/Gr cells with CE101, CE102 and EE101.

The formulations prepared are used as electrolytes in 5.0 Ah Li-ion pouch cells comprising NMC811 cathode active material and graphite as the anode active material. The cell operation voltage window is 4.2-2.8 V. In each cell, 15 g of electrolyte was added and allowed to soak in the cell for 1 hour. After sealing, the cells were charged to 3.7 V at C/25 rate before degassing, followed by vacuum sealing. After degassing, the cells were charged and discharged twice between 4.2 to 2.8 V at C/10 rate, and then charged and discharged six hundred times between 4.2 to 2.8 V at 0.5 C rate at 25° C. or subjected to a high temperature storage test. FIG. 6 shows the cycle life characteristics of 5.0 Ah NMC811/Gr cells at 45° C. during cycling at 0.5 C rate for charging and discharging. The capacity retention of cells with EE101 is comparable to that of cells with CE101 and CE102, with retention ~75% after 600 cycles. The cells subjected to a high temperature storage test were charged to 100% state-of-charge at 4.2 V and placed in an environmental chamber set to 60° C. Every two weeks, the AC-IR, thickness, and capacity recovery of the cells was measured. The results are summarized in Table I. As can be seen in Table I, all cells demonstrated an increase in internal resistance, some swelling attributable to gas generation and loss of capacity. However, the embodiment example EE101 has lowest increase in AC-IR and the increase in cell thickness is significantly lower than CE101. Even though the AC-IR increase is low in CE102, cells with EE101 have lower thickness after 10 weeks of storage.

TABLE I

Storage Data for 5.0 Ah NMC811/Gr cells with CE101, CE102 and EE101

| | AC-IR (%) | | Cell Thickness (%) | | Capacity Recovery (%) | |
|---|---|---|---|---|---|---|
| Electrolyte | Week 0 | Week 10 | Week 0 | Week 10 | Week 0 | Week 10 |
| CE101 | 100.0 | 245.3 | 100.0 | 124.3 | 100.0 | 45.2 |
| CE102 | 100.0 | 200.8 | 100.0 | 124.8 | 100.0 | 53.5 |
| EE101 | 100.0 | 237.0 | 100.0 | 115.8 | 100.0 | 52.2 |

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. An electrochemical energy storage device electrolyte comprising:

an aprotic organic solvent system;

a metal salt; and at least one epoxide functionalized organic compound additive according to the formula I, II, III, IV, V or VI:

(II)

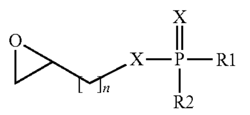

(III)

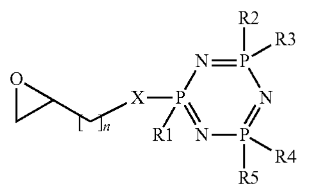

(IV)

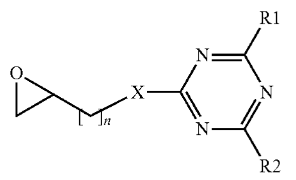

(V)

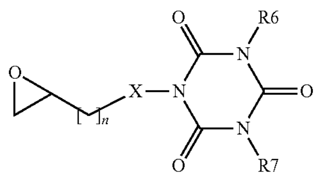

(VI)

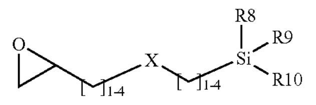

wherein:

n is an integer from 1 to 8;

X is oxygen or sulfur for formulae III, IV, and V;

X is sulfur for formulae II and VI;

R1, R2, R3, R4, and R5 are independently a halogen, oxygen or sulfur atom, further bonded to $C_1$-$C_{12}$ substituted or unsubstituted alkyl groups, or $C_6$-$C_{14}$ aryl group, $C_1$-$C_{12}$ substituted or unsubstituted alkyl group, or $C_6$-$C_{14}$ aryl group, wherein any hydrogen or carbon atom can be unsubstituted or can be independently substituted with halogen, alkyl, alkoxy, perfluorinated alkyl, silyl, siloxy, silane, sulfoxide, amide, azo, ether, or thioether group or combination thereof;

R6 and R7 are independently an oxygen or sulfur atom, further bonded to $C_1$-$C_{12}$ substituted or unsubstituted alkyl group, or $C_6$-$C_{14}$ aryl groups, independently $C_1$-$C_{12}$ substituted or unsubstituted alkyl group, or $C_6$-$C_{14}$ aryl group, wherein any hydrogen or carbon atom can be unsubstituted or can be independently substituted with an epoxide, halogen, alkyl, alkoxy, perfluorinated alkyl, silyl, siloxy, silane, sulfoxide, amide, azo, ether, or thioether group or combination thereof; and R8, R9, and R10 are independently selected from hydrogen, $C_1$-$C_{12}$ alkyl groups, heteroalkyl groups, perfluoroalkyl groups, alkenyl groups, aryl or alkoxy groups.

2. The electrolyte of claim 1, wherein the at least one epoxide functionalized organic compound additive is at least one of glycidyl difluoro phosphite, glycidyl dimethyl phosphite, glycidyl bis (trifluoromethyl) phosphite, glycidyl diethyl phosphite, glycidyl bis (2,2,2-trifluoroethyl) phosphite, glycidyl bis (perfluoroethyl) phosphite, glycidyl diisopropyl phosphite, and glycidyl bis (1,1,1,3,3,3-hexafluoro-2-propyl) phosphite, (3-glycidyloxypropyl) trimethoxysilane, and mixture thereof.

3. The electrolyte of claim 1, wherein the at least one epoxide functionalized organic compound additive is present in a concentration of from 0.01 wt. % to 10 wt. % in the electrolyte.

4. The electrolyte of claim 1, wherein the aprotic organic solvent system comprises an open-chain or cyclic carbonate, carboxylic acid ester, nitrite, ether, sulfone, ketone, lactone, dioxolane, glyme, crown ether, siloxane, phosphoric acid ester, phosphite, mono-or polyphosphazene or mixture thereof.

5. The electrolyte of claim 1, wherein the aprotic organic solvent system is present in a concentration of from 60 wt. % to 90 wt. % in the electrolyte.

6. The electrolyte of claim 1, wherein the cation of the metal salt is an alkali metal.

7. The electrolyte of claim 6, wherein the alkali metal is lithium or sodium.

8. The electrolyte of claim 1, wherein the cation of the metal salt is aluminum or magnesium.

9. The electrolyte of claim 1, wherein the metal salt is present in a concentration of from 10 wt. % to 30 wt. % in the electrolyte.

10. The electrolyte of claim 1, further comprising at least one additional additive.

11. The electrolyte of claim 10, wherein the at least one additional additive comprises a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride or the mixture thereof.

12. The electrolyte of claim 10, wherein the at least one additional additive comprises a partially or fully halogenated phosphoric acid ester compound, an ionic liquid, a (methylsulfonyl) cyclotriphosphazene, or mixture thereof.

13. The electrolyte of claim 12, wherein the partially or fully halogenated phosphoric acid ester compound is 4-fluorophenyldiphenylphosphate, 3,5-difluorophenyldiphenylphosphate, 4-chlorophenyldiphenylphosphate, trifluorophenylphosphate, heptafluorobutyldiphenylphosphate, trifluoroethyldiphenylphosphate, bis (trifluoroethyl) phenylphosphate, or phenylbis (trifluoroethyl) phosphate.

14. The electrolyte of claim 12, wherein the ionic liquid is tris (N-ethyl-N-methylpyrrolidinium) thiophosphate bis (trifluoromethylsulfonyl) imide, tris (N-ethyl-N-methylpyrrolidinium) phosphate bis (trifluoromethylsulfonyl) imide, tris (N-ethyl-N-methylpiperidinium) thiophosphate bis (trifluoromethylsulfonyl) imide, or tris (N-ethyl-N-methylpiperidinium) phosphate bis (trifluoromethylsulfonyl) imide.

15. The electrolyte of claim 10, wherein the at least one additional additive is present in a concentration of from 0.01 wt. % to 10 wt. % in the electrolyte.

16. An electrochemical energy storage device comprising:

a cathode;

an anode;

an electrolyte according to claim 1; and a separator.

17. The device of claim 16, wherein the cathode comprises a lithium metal oxide, spinel, olivine, carbon-coated olivine, vanadium oxide, lithium peroxide, sulfur, polysulfide, a lithium carbon monofluoride or mixture thereof.

18. The device of claim 17, wherein the lithium metal oxide is $LiCoO_2$, $LiNiO_2$, $LiNi_xCo_yMet_2O_2$, $LiMn_{0.5}Ni_{0.5}O_2$, $LiMn_{0.1}Co_{0.1}Ni_{0.8}O_2$, $LiMn_{0.2}Co_{0.2}Ni_{0.6}O_2$, $LiMno_3Co_{0.2}Ni_{0.5}O_2$, $LiMn_{0.33}Co_{0.33}Ni_{0.33}O_2$, $LiMn_2O_4$, $LiFeO_2$, $Li_{1+x'}Ni_{\alpha}Mn_{\beta}Co_{\gamma}Met'_{\delta}O_{2-z'}F_{z'}$, or $A_{n'}B_2(XO_4)_3$, wherein Met is Al, Mg, Ti, B, Ga, Si, Mn or Co; Met' is Mg, Zn, Al, Ga, B, Zr or Ti; A is Li, Ag, Cu, Na, Mn, Fe, Co, Ni, Cu or Zn; B is Ti, V, Cr, Fe or Zr; X is P, S, Si, W or Mo; and wherein $0 \leq x \leq 0.3$, $0 \leq y \leq 0.5$, $0 \leq z \leq 0.5$, $0 \leq x' \leq 0.4$, $0 \leq \alpha \leq 1 \leq \beta \leq 1$, $0 \leq \gamma \leq 1$, $0 \leq \delta \leq 0.4$, $0 \leq z' \leq 0.4$ and $0 \leq h' \leq 3$.

19. The device of claim 17, wherein the anode comprises lithium metal, graphitic material, amorphous carbon, $Li_4TisO_{12}$, tin alloy, silicon, silicon alloy, intermetallic compound, or mixture thereof.

20. The device of claim 16, wherein the device comprises a lithium battery, lithium-ion battery, lithium-sulfur battery, lithium-air battery, sodium ion battery, magnesium battery, lithium/$MnO_2$ battery, or Li/poly (carbon monofluoride) battery.

21. The device of claim 16, wherein the device comprises a capacitor or solar cell.

22. The device of claim 16, wherein the device comprises an electrochemical cell.

23. The device of claim 16, wherein the separator comprises a porous separator separating the anode and cathode from each other.

24. The device of claim 16, wherein the porous separator comprises an electron beam-treated micro-porous polyolefin separator or a microporous polymer film comprising nylon, cellulose, nitrocellulose, polysulfone, polyacrylonitrile, polyvinylidene fluoride, polypropylene, polyethylene, polybutene, or co-polymer or blend of any two or more such polymers.

25. The device of claim 16, wherein the aprotic organic solvent system comprises an open-chain or cyclic carbonate, carboxylic acid ester, nitrite, ether, sulfone, ketone, lactone, dioxolane, glyme, crown ether, siloxane, phosphoric acid ester, phosphite, mono- or polyphosphazene or mixture thereof.

26. The device of claim 16, wherein the aprotic organic solvent system is present in a concentration of from 60 wt. % to 90 wt. % in the electrolyte.

27. The device of claim 16, wherein the cation of the metal salt is an alkali metal.

28. The device of claim 27, wherein the alkali metal is lithium or sodium.

29. The device of claim 16, wherein the cation of the metal salt is aluminum or magnesium.

30. The device of claim 16, wherein the metal salt is present in a concentration of from 10 wt. % to 30 wt. % in the electrolyte.

31. The device of claim 16, wherein the electrolyte further comprises at least one additional additive.

32. The device of claim 31, wherein the at least one additional additive comprises a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride or mixture thereof.

33. The device of claim 31, wherein the at least one additional additive comprises a partially or fully halogenated phosphoric acid ester compound, an ionic liquid, (methylsulfonyl) cyclotriphosphazene, or mixture thereof.

34. The device of claim 33, wherein the halogenated phosphoric acid ester compound is 4-fluorophenyldiphenylphosphate, 3,5-difluorophenyldiphenylphosphate, 4-chlorophenyldiphenylphosphate, trifluorophenylphosphate, heptafluorobutyldiphenylphosphate, trifluoroethyldiphenylphosphate, bis (trifluoroethyl) phenylphosphate, or phenylbis (trifluoroethyl) phosphate.

35. The device of claim 33, wherein the ionic liquid is tris (N-ethyl-N-methylpyrrolidinium) thiophosphate bis (trifluoromethylsulfonyl) imide, tris (N-ethyl-N-methylpyrrolidinium) phosphate bis (trifluoromethylsulfonyl) imide, tris (N-ethyl-N-methylpiperidinium) thiophosphate bis (trifluoromethylsulfonyl) imide, tris (N-ethyl-N-methylpiperidinium) phosphate bis (trifluoromethylsulfonyl) imide, N-methyl-trimethylsilylpyrrolidinium bis (trifluoromethylsulfonyl) imide, or N-methyl-trimethylsilylpyrrolidinium hexafluorophosphate.

36. The device of claim 31, wherein the at least one additional additive is present in a concentration of from 0.01 wt. % to 10 wt. % in the electrolyte.

* * * * *